(12) United States Patent
Kosaka

(10) Patent No.: US 11,719,581 B2
(45) Date of Patent: Aug. 8, 2023

(54) BOLOMETER AND METHOD FOR MANUFACTURING SAME

(71) Applicant: NEC Corporation, Tokyo (JP)

(72) Inventor: Mayumi Kosaka, Tokyo (JP)

(73) Assignee: NEC CORPORATION, Tokyo (JP)

(*) Notice: Subject to any disclaimer, the term of this patent is extended or adjusted under 35 U.S.C. 154(b) by 0 days.

(21) Appl. No.: 17/731,808

(22) Filed: Apr. 28, 2022

(65) Prior Publication Data

US 2022/0364933 A1 Nov. 17, 2022

(30) Foreign Application Priority Data

May 12, 2021 (JP) .................... 2021-080925

(51) Int. Cl.
G01J 5/22 (2006.01)

(52) U.S. Cl.
CPC .................... *G01J 5/22* (2013.01)

(58) Field of Classification Search
CPC .......................................... G01J 5/22
See application file for complete search history.

(56) References Cited

U.S. PATENT DOCUMENTS

| 2013/0216469 A1* | 8/2013 | Sekino | C01B 32/174 252/502 |
| 2019/0129300 A1* | 5/2019 | Ono | C01B 32/159 |
| 2021/0214247 A1* | 7/2021 | Takagi | B01D 61/10 |

FOREIGN PATENT DOCUMENTS

| JP | 6455910 B2 | 1/2019 |
| JP | 6717316 B2 | 7/2020 |
| WO | 2012/049801 A1 | 4/2012 |

* cited by examiner

*Primary Examiner* — David P Porta
*Assistant Examiner* — Gisselle M Gutierrez
(74) *Attorney, Agent, or Firm* — Sughrue Mion, PLLC

(57) ABSTRACT

An object of the present invention is to provide a bolometer having a high TCR value and a low resistance, and a method for manufacturing the same.
The present invention relates to a bolometer manufacturing method including: fabricating a set of two carbon nanotube wires that are approximately parallel to each other at edges of a line shape, or fabricating a circular shape carbon nanotube wire at a circular circumference of a circular shape, by applying a semiconducting carbon nanotube dispersion liquid in the line shape or the circular shape on a substrate, and drying the dispersion liquid, a width of each wire being 5 μm or more; and connecting a part of each wire to a first electrode and a second electrode.

10 Claims, 7 Drawing Sheets

BOLOMETER AND METHOD FOR MANUFACTURING SAME

This application is based upon and claims the benefit of priority from Japanese patent application No. 2021-080925, filed on May 12, 2021, the disclosure of which is incorporated herein in its entirety by reference.

TECHNICAL FIELD

The present invention relates to a bolometer using carbon nanotubes and a method for manufacturing the same.

BACKGROUND ART

As infrared sensors, quantum infrared sensors using HgCdTe as a material have been widely used; however, it is necessary to cool an element to a temperature that is equal to or lower than a temperature of liquid nitrogen, imposing a restriction in downsizing of the apparatus. Therefore, uncooled infrared sensors not requiring cooling of an element to a low temperature have recently attracted attention and bolometers that detect an electrical resistance change caused by a change in temperature of an element have been widely used.

For performance of a bolometer, a rate of electrical resistance change for temperature change, which is called TCR (temperature coefficient of resistance), and a resistivity are particularly important. As an absolute value of the TCR is larger, a temperature resolution of the infrared sensor becomes smaller and the sensitivity is thus enhanced. Also, for noise reduction, the resistivity needs to be lowered.

Conventionally, as an uncooled bolometer, a vanadium oxide thin film is used; however, because of a vanadium oxide thin film having a small TCR (approximately −2.0%/K), enhancement in TCR has been widely studied. For TCR enhancement, a material having semiconducting properties and a large band gap is needed, and thus, application of semiconducting single-walled carbon nanotubes to a bolometer is expected.

Patent Literature 1 proposes bolometer fabrication having a thin film process of employing normal single-walled carbon nanotubes for a bolometer portion, in which a dispersed liquid resulting from single-walled carbon nanotubes being mixed in an organic solvent is cast onto electrodes and the single-walled carbon nanotubes is subjected to annealing treatment in the air.

Patent Literature 2 proposes bolometer fabrication in which, because metal and semiconducting components are mixed in a single-walled carbon nanotube, semiconducting single-walled carbon nanotubes are extracted using an ionic surfactant and employed for a bolometer portion.

Also, Patent Literature 3 proposes a method for fabricating a transparent electrically conductive film by forming two electrically conductive wires from a line-shape liquid of an electrically conductive material via the coffee stain effect and removing one of the wires.

CITATION LIST

Patent Literature

Patent Literature 1: International Publication No. WO2012/049801
Patent Literature 2: Japanese Patent No. 6455910
Patent Literature 3: Japanese Patent No. 6717316

SUMMARY OF INVENTION

Technical Problem

However, in the carbon nanotube thin film used for the infrared sensor described in Patent Literature 1, since metallic carbon nanotubes are present in a mixed state in carbon nanotubes, TCR is low, and the improvement of the performance of the infrared sensor is limited. In addition, the infrared sensor using semiconducting carbon nanotubes described in Patent Literature 2 has a problem in that the ionic surfactant for separation cannot be easily removed. The functional wires described in Patent Literature 3 are wires of electrically conductive fine particles to be used for a transparent electrically conductive film and have a problem of requiring a step of removing one of two wires. For use of such functional wires in an infrared sensor, a semiconducting material is suitable and a low resistance is desirable, and thus, the wire needs to have a larger wire width.

The present invention has been made in view of the above circumstances and an object of the present invention is to provide a bolometer having a high TCR value and a low resistance, and a method for manufacturing the same. An aspect of the present invention also provides a method for manufacturing a microscopic of semiconducting carbon nanotube wire via a simple method.

Solution to Problem

In order to solve the aforementioned problems, the present invention has the following features.

One aspect of the present invention relates to a bolometer manufacturing method comprising:

fabricating a set of two carbon nanotube wires that are approximately parallel to each other at edges of a line shape, or fabricating a circular shape carbon nanotube wire at a circular circumference of a circular shape, by applying a semiconducting carbon nanotube dispersion liquid in the line shape or the circular shape on a substrate and drying the dispersion liquid, a width of each wire being 5 μm or more; and connecting a part of each wire to a first electrode and a second electrode.

Advantageous Effect of Invention

According to the present invention, a bolometer having a high TCR value and a low resistance, and a method for manufacturing the same can be provided.

Also, according to an aspect of the present invention, which is capable of downsizing a carbon nanotube layer via a simple method, it is possible to downsize a bolometer element.

In addition, a manufacturing method according to an aspect of the present invention is excellent in high mass productivity and low cost.

DESCRIPTION OF EMBODIMENTS

Figure 1:
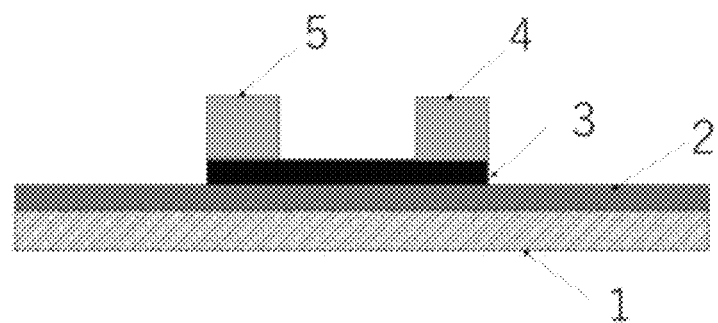
FIG. 1 is a sectional schematic view of a bolometer portion.

The invention of the present application has the features described above, and the embodiments will be explained below. Although the embodiments described below have technically preferred limitations for carrying out the invention, the scope of the invention is not limited to the following.

Carbon nanotubes can be deposited at an edge of a line or a dot on a substrate using capillarity occurring in a droplet of a carbon nanotube dispersion liquid, by applying the dispersion liquid in a line shape or a dot shape (circular shape) on the substrate (patterning), and drying the dispersion liquid. Consequently, a set of two carbon nanotube wires that are approximately parallel to each other can be fabricated at edges of a line shape, or a circular shape carbon nanotube wire can be fabricated at an edge of a dot (a circumference of a circular shape). A bolometer electrode is formed by connecting a carbon nanotube wire fabricated as above to a first electrode and a second electrode.

As stated above, each of bolometer manufacturing methods of the present embodiments enables a carbon nanotube wire having a desired shape and size to be easily formed on a substrate by forming a droplet of a carbon nanotube dispersion liquid in a desired pattern shape.

Furthermore, in an embodiment, a bolometer in which carbon nanotubes are disposed approximately perpendicularly to two or more lines of electrode pairs at one time from one line of droplet or one line of dot droplets can be manufactured. More specifically, a line-shape wire formed from a line-shape dispersion liquid droplet, or a line of circular shape wires formed from a line of circular shape dispersion liquid droplets is/are connected to no less than two lines of electrode pairs. Here, a carbon nanotube wire is connected approximately perpendicularly to each of electrode pairs included in the electrode pair lines (that is, approximately in parallel with electrical current flowing between each of the electrode pairs).

In an embodiment, it is preferred that an interlayer having a function that enhances binding between a substrate and carbon nanotubes is formed on the surface of the substrate. Such interlayer is preferably formed in an area larger than the area in which a droplet of a carbon nanotube dispersion liquid is to be formed, and may also be formed on an entire surface of the substrate.

In each of the below examples, an example in which an APTES layer or a polylysine layer is used as an interlayer, and an Si substrate or a plastic substrate is used as a substrate will be described; however, the interlayer and the substrate are not limited thereto.

Also, in a bolometer manufacturing method, processes other than a process of forming a carbon nanotube layer on a substrate are not limited to those described below by example, and those used in the relevant technical field can be used with no specific limitation.

In the present specification, the term "approximately perpendicular" encompasses perfect perpendicularity, and deviations within a range of 30° or less, preferably 20° or less, for example, 10° or less from the perfect perpendicularity. The term "approximately parallel" encompasses perfect parallelism and deviations within a range of 30° or less, preferably 20° or less, for example, 10° or less from the perfect parallelism. Also, it is preferable that "approximately perpendicular" and "approximately parallel" include not only a case where a side intersecting a target (for example, an electrode) is a straight line but also a case where a side intersecting a target (for example, an electrode) is a part of a circular arc, and in such case, it is preferable that a tangent to the circular arc be within the above range.

In the present specification, "carbon nanotube wire" means a carbon nanotube layer in a fine line-like form in which carbon nanotubes are accumulated or aggregated in a wire shape (e.g., a carbon nanotube layer in a fine liner shape), and may also be referred to as, e.g., "carbon nanotube layer". The term "carbon nanotube wire" can mean both a carbon nanotube wire with networked carbon nanotubes and a wire-shape carbon nanotube aligned film in which carbon nanotubes are aligned in a certain direction.

Also, "APTES layer" may be referred to as "APTES film" or the like.

Also, a bolometer according to the present embodiment can also be used for detection of electromagnetic wave having a wavelength of, for example, 0.7 μm to 1 mm, for example, terahertz wave in addition to infrared light. In an embodiment, the bolometer is an infrared sensor. Also, the bolometer manufacturing method of the present embodiment can suitably be applied to manufacture of a bolometer array.

First Embodiment

FIG. 1 illustrates a schematic sectional view of a bolometer portion according to an embodiment of the present invention. A 3-aminopropyltriethoxysilane (APTES) layer 2 is provided on an Si substrate 1, a carbon nanotube layer 3, a first electrode 4 and a second electrode 5 are provided thereon, and the electrode 4 and the electrode 5 are connected by the carbon nanotube layer 3 located therebetween. Disposition of the APTES layer 2, the carbon nanotube layer 3 and the electrodes 4, 5 on the substrate 1 is not limited to the disposition illustrated in FIG. 1, and the first electrode 4 and the second electrode 5 may be disposed on the APTES layer or may be disposed directly on the Si substrate 1. Also, the carbon nanotube layer 3 may be provided below or above the electrodes as long as the carbon nanotube layer 3 is partly provided on the APTES layer 2 and connects the first electrode 4 and the second electrode 5. As described later, it is preferable that the carbon nanotube layer 3 mainly consists of a plurality of semiconducting carbon nanotubes separated using a non-ionic surfactant.

Figure 3:
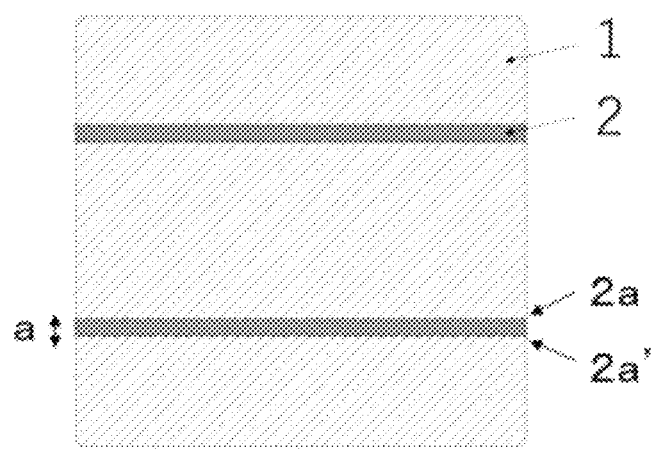
FIG. 3 is a schematic view in which a carbon nanotube dispersion liquid is patterned into two line shapes on a substrate.

Si covered with $SiO_2$, which is a substrate, is sequentially washed with acetone, isopropyl alcohol and water to remove organic substances on a surface via oxygen plasma treatment. This substrate is immersed in an APTES aqueous solution, or an APTES aqueous solution is sprayed onto the substrate, and the substrate is washed with water and then dried. As illustrated in FIG. 3, a semiconducting carbon nanotube dispersion liquid resulting from dispersion in an aqueous solution of polyoxyethylene alkyl ether such as polyoxyethylene (100) stearyl ether or polyoxyethylene (23) lauryl ether, which is a non-ionic surfactant, is applied in a line shape 2 on the APTES layer. Next, when the substrate is put under conditions in which a solvent of the dispersion liquid can evaporate, water of the dispersion liquid is gradually dried from edges of the line shape because an evaporation rate is higher in the vicinity of an outer edge of a droplet than in the vicinity of a center of the droplet. At that time, the edges of the line shape each serve to pin a contact line of the droplet, causing a capillary flow toward the edge to occur inside the droplet, and carbon nanotubes move outward from the center of the droplet, and the moved carbon nanotubes accumulate in the vicinities of the edges (2a and 2a') while being aligned approximately in parallel with the edges. Consequently, a carbon nanotube aligned film can be formed at each of opposite edges of the line shape. Also, a degree of alignment of carbon nanotubes can be controlled by conditions such as a diameter and a length of the carbon nanotubes, a concentration of a surfactant and a drying rate, and adjustment of these conditions also enables obtainment of a line-shape accumulation of networked carbon nanotubes that are little aligned.

Examples of a method for applying a carbon nanotube dispersion liquid in a desired shape to a substrate include, e.g., a dispenser, an inkjet, a printer and the like. A droplet amount can appropriately be adjusted to be within a range in which a desired droplet shape can be maintained and capillarity can occur in a droplet.

The water contact angle between the substrate and the droplet can be from more than 0° and 90° or smaller, but is preferably more than 0° and 60° or smaller. The water contact angle can be obtained using the static method specified in JIS R3257; 1999. The water contact angle of a droplet can be controlled by the amount of the droplet relative to the area of the carbon nanotube dispersion liquid applied portion (line shape).

The width a of the line shape of the dispersion liquid (width a in FIG. 3) is desirably 20 µm to 1 cm, preferably 20 µm to 1 mm, and more preferably 30 µm to 500 µm.

Carbon nanotubes are deposited in the vicinity of the edge of the dispersion liquid applied portion. The width to be deposited can be varied depending on, for example, the amount of dispersion liquid, the type and concentration of carbon nanotubes in the dispersion liquid, the type and concentration of a surfactant, the diameter and length of carbon nanotubes, the substrate temperature and relative humidity, and the like, and a deposited layer of carbon nanotubes deposited in a width of 5 µm to 30 µm from the edge is desirable, and more preferably 7 µm to 20 µm wide. Semiconducting type is used as the carbon nanotubes, from the view point of lowering resistance, the width is preferably 5 µm or more, and more preferably 7 µm or more. In addition, a width of 30 µm or less is preferred, and 20 µm or less is more preferred from the viewpoint of miniaturization. The width to be deposited (width of the carbon nanotube film) can be the average of the measured values at arbitrary 10 points measured by scanning electron microscopy or other means.

The thickness of the carbon nanotube layer is not limited, but is preferably, for example, 5 nm or more, more preferably 10 nm or more, for example 20 nm or more, and more preferably 30 nm or more, and preferably 10 µm or less, more preferably 5 µm or less, and even more preferably 1 µm or less, preferably in the region within 10 µm from the edge of the line shape. The thickness of the carbon nanotubes can be measured using a laser microscope at arbitrary 10 points within 10 µm from the edge, and the thickness can be taken as the average value.

Figure 2:
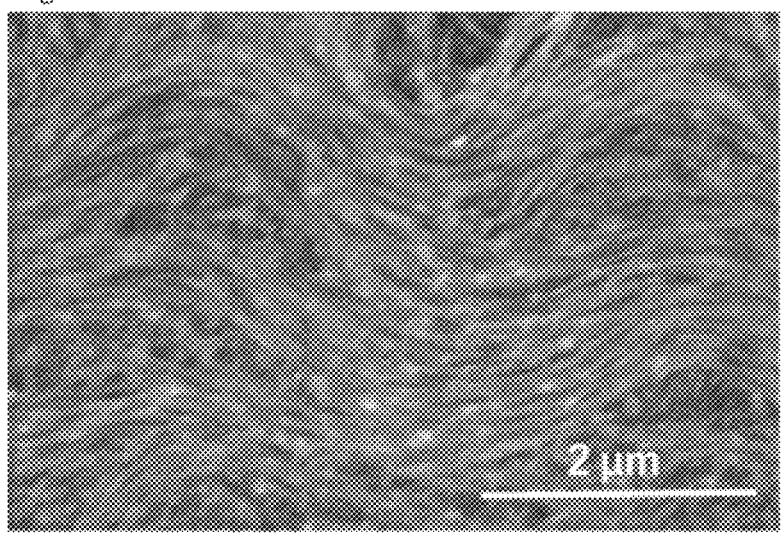
FIG. 2 is an SEM image of an edge portion of a line-shape.

When carbon nanotubes are deposited in the vicinity of an edge of a dispersion liquid applied portion via the manufacturing method according to the present embodiment, it is also possible to align carbon nanotubes. FIG. 2 is a scanning electronic microscope (SEM) image of a part several micrometers on the center side from an edge of a dispersion liquid applied portion (the edge of the dispersion liquid applied portion is on the upper edge side of the image). As illustrated in FIG. 2, carbon nanotubes can be deposited in such a manner as to be aligned approximately in parallel with an edge of a dispersion liquid applied portion. Also, some of carbon nanotubes can be aligned or carbon nanotubes can be deposited in a networked fashion without being aligned.

A degree of alignment of carbon nanotubes can be controlled by conditions such as a diameter and a length of the carbon nanotubes, a concentration of a surfactant, a drying rate and the like. In order to increase the degree of alignment, it is desirable that the solvent of the dispersion liquid be evaporated at a low speed, and a temperature of the substrate when the solvent of the dispersion liquid is evaporated is, for example, desirably 5° C. to 60° C., preferably 10° C. to 40° C. A relative humidity is preferably 15% RH to 80% RH.

The degree of alignment of carbon nanotubes is defined in a plane FFT image obtained by performing two-dimensional fast Fourier transform on the SEM image of a carbon nanotube film and representing the distribution of unevenness in each direction by a frequency distribution, where a value obtained by integrating amplitudes of frequencies from $-1$ µm$^{-1}$ to $+1$ µm$^{-1}$ in one direction from the center is defined as an integrated value f, an integrated value in the direction x in which the integrated value f becomes maximum is defined as fx, an integrated value in the direction y vertical to the direction x is defined as fy, and the carbon nanotubes are defined as being aligned when fx/fy≥2. In the manufacturing method according to the present embodiment, a carbon nanotube wire in which carbon nanotubes are not aligned (or have a low degree of alignment) with fx/fy=1 to 2 can be produced, and also, an aligned carbon nanotube wire with fx/fy≥2 can also be produced by adjusting the above mentioned manufacturing conditions. The SEM image which is the original image of the above FFT image needs to have visible unevenness for calculation by Fourier transform, and from the viewpoint of observing carbon nanotubes, the visual field range is preferably about 0.05 to 10 µm in vertical and horizontal directions.

The carbon nanotube layer comprises semiconducting carbon nanotubes preferably in a ratio of 90% by mass or more, more preferably 95% by mass or more, and in some cases even more preferably 98% by mass or more, of the total carbon nanotubes. For the production of such carbon nanotube layers, it is desirable to use a dispersion liquid with a high concentration of semiconducting carbon nanotubes, which is obtained by separating metallic carbon nanotubes and semiconducting carbon nanotubes using, for example, the electric field-induced layer formation method or the like.

The diameter of the carbon nanotubes is desirably 0.6 to 1.5 nm, preferably 0.6 to 1.2 nm, and more preferably 0.6 to 1.0 nm. The length of the carbon nanotubes is preferably in the range of 100 nm to 5 μm for easy dispersion and easy droplet formation. From the perspective of the conductivity of carbon nanotubes, a length of 100 nm or more is preferred, and from the perspective of less aggregation, a length of 5 μm or less is preferred. More preferably, the length is 500 nm to 3 μm, even more preferably 700 nm to 1.5 μm. It is preferred that at least 70% (number) of the carbon nanotubes have a diameter and a length in the above range.

When the diameter and the length of the carbon nanotubes are within the above range, the effect of semiconducting property becomes greater when semiconducting carbon nanotubes are used, and a large current value can be obtained, so that a high TCR value is easily obtained when used in a bolometer.

An APTES solution and a carbon nanotube dispersion liquid that can be used in the manufacturing method according to the present embodiment are described below.

A concentration of the APTES solution is not specifically limited, but, for example, is preferably 0.001% by volume or more and 30% by volume or less, more preferably 0.01% by volume or more and 10% by volume or less, still more preferably 0.05% by volume or more and 5% by volume or less. Also, a solvent for APTES is water or is not specifically limited as long as the solvent is one that allows the compound to dissolve and can easily be removed after being applied to the substrate.

Note that if a compound other than APTES is used as an interlayer, these concentration and solvent may arbitrarily be changed according to the compound used.

The carbon nanotube dispersion liquid used in the manufacturing method according to the present embodiment is described below.

The carbon nanotube dispersion liquid comprises the above-described carbon nanotubes. The concentration and the amount of droplet may be appropriately selected depending on the density and thickness and the like of the carbon nanotube layer to be formed. The concentration of carbon nanotubes in the dispersion liquid is not particularly limited but may be, for example, 0.0003% by mass or more, preferably 0.001% by mass or more, more preferably 0.003% by mass or more, and 10% by mass or less, preferably 3% by mass or less, more preferably 0.3% by mass or less.

The carbon nanotube dispersion liquid preferably comprises a surfactant in addition to the carbon nanotubes. When carbon nanotubes are deposited in the vicinity of an edge of a dispersion liquid applied portion in the manufacturing method according to the present embodiment, carbon nanotubes can be more easily aligned when the carbon nanotube dispersion liquid comprises a surfactant. The concentration of the surfactant in the dispersion liquid is not particularly limited, but for example, a critical micelle concentration or more to about 5% by mass or less is preferred, and 0.001% by mass or more to 3% by mass or less is more preferable, and 0.01% by mass or more to 1% by mass or less is particularly preferred. The surfactant in the carbon nanotube dispersion liquid is preferably a non-ionic surfactant. Unlike ionic surfactants, non-ionic surfactants have a weaker interaction with carbon nanotubes, and can be easily removed after the dispersion liquid is provided on the substrate. Therefore, stable carbon nanotube conductive paths can be formed and an excellent TCR value can be obtained. Aligned carbon nanotubes results in a lower resistance as the contact area between carbon nanotubes is increased and more conductive paths are formed. Consequently, a larger resistance change for a temperature change can be achieved.

On the other hand, also in a case where the carbon nanotubes are in a network state or have a lower degree of alignment, increased density and film thickness of carbon nanotubes can be achieved. In addition, it is preferred to use a non-ionic surfactant with a longer molecular length because re-aggregate of carbon nanotubes is suppressed and a network state can be maintained. Formation of a dense network of carbon nanotubes increases the number of contact points between carbon nanotubes and increases the number of conductive paths, thus achieving a lower resistance. In addition, the probability of the slightly contained metallic carbon nanotubes connecting with each other and connecting between electrodes is low, as a result, the effect of semiconducting property becomes larger, and a larger resistance change for a temperature change can be achieved.

Non-ionic surfactants can be appropriately selected, and it is preferable to use a non-ionic surfactant with a polyethylene glycol structure, typified by polyoxyethylene alkyl ether-based ones, singly or in combination.

The solvent of the carbon nanotube dispersion liquid is not limited as long as the carbon nanotubes can be suspended in a dispersion, and includes, for example, water, heavy water, organic solvents or mixtures thereof, with water being preferred.

As the methods of separating and preparing a carbon nanotube dispersion liquid with a high proportion of semiconducting carbon nanotubes, and non-ionic surfactants used in said methods, methods described in WO 2020/158455, for example, can be used, and the document is incorporated herein by reference.

A bolometer of the present embodiment can be manufactured, for example, as follows after forming such line-shape fine wires of semiconducting carbon nanotubes as above on a substrate. Since carbon nanotubes are deposited at opposite edges of a line, carbon nanotube wires are fabricated in a shape of two lines that are approximately parallel to each other. First electrodes and second electrodes are fabricated on the carbon nanotube wires via, e.g., gold vapor deposition. It is also preferable that the carbon nanotubes of the carbon nanotube wires be aligned approximately in parallel with the edges of the line shape. At this time, electrodes are installed in such a manner that the direction of alignment of carbon nanotubes and a direction of electrical current flowing between each first electrode and the corresponding second electrode are approximately parallel to each other.

In the bolometer of the present embodiment, the distance between the first electrode and the second electrode is preferably 1 μm to 500 μm, and more preferably 10 μm to 300 μm. For miniaturization, it is more preferably 1 μm to 200 μm. When the distance between electrodes is 1 μm or more, a reduction in the nature of TCR can be suppressed, even in the case of containing a small amount of metallic carbon nanotubes. In addition, the distance between electrodes of 50 μm or less is advantageous when the bolometer is applied to an image sensor by two-dimensionally arraying. The length of the electrode 4 and the electrode 5 is preferably short as long as carbon nanotubes can connect the both electrodes and electrically connect them, and the part connecting to carbon nanotubes of 50 μm or less is advantageous when the bolometer is applied to an image sensor by two-dimensionally arraying.

Figure 4A:
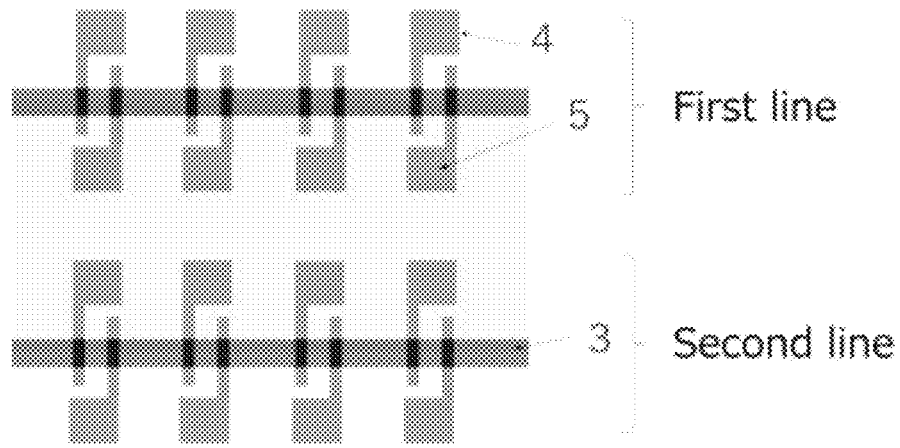
FIG. 4A is an example in which two edges of a line shape are arranged to different electrode pair lines.

The electrodes are installed in such a manner as to be connected by both of the two carbon nanotube wires formed on the opposite ends of the line shape or are installed in such a manner as to be connected by either one of the wires. The electrodes being connected by two wires allows a resistance to be reduced by approximately half and thus is advantageous for reduction in resistance; however, a length of the electrodes needs to be longer than that of a region including the two wires. On the other hand, the electrodes being connected by one wire alone, which is either one edge, enables making a width of connection between carbon nanotubes and the electrodes narrow, for example, 50 μm or less, which is advantageous for element downsizing such as two-dimensional arraying. Also, applying the dispersion liquid in such a manner that a width of applied dispersion liquid corresponds to an interval of elements as in FIG. 4A (upper diagram) enables using wires at opposite ends for two lines, a first line and a second line, of electrode pairs at one time and thus enables simple and easy arraying.

Figure 5:
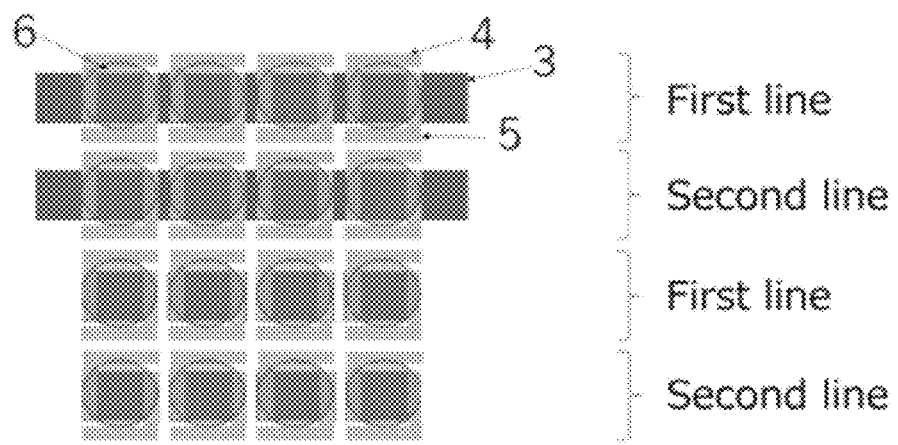
FIG. 5 is an example in which PMMA is applied on the electrode part of a line shape array and unnecessary CNT is removed.

As illustrated in FIG. 5, where carbon nanotubes are connected also to an adjacent electrode pair because of the carbon nanotube wire being in a line shape (extending across a plurality of electrode pairs), it is necessary to remove unnecessary carbon nanotubes via, for example, the following method. An acrylic resin solution such as polymethyl-methacrylate resin (PMMA) is applied to regions 6 each including an area between electrodes of each electrode pair on the formed carbon nanotube wire 3 to form protective layers of PMMA. The substrate is heated at 200° C. in the atmosphere, extra solvent, impurities, etc., are removed and then the entire substrate is subjected to oxygen plasma treatment to remove extra carbon nanotubes, etc., present in regions, other than the regions 6 covered by the PMMA layers, of the carbon nanotube layer 3.

Figure 4B:
FIG. 4B is an example in which an array is manufactured using a line shape.

FIG. 4B (lower diagram) illustrates an example of arraying in the present embodiment. Electrodes are installed in such a manner that two lines of carbon nanotubes bridge each of electrode pairs in a first electrode line and each of electrode pairs in a second electrode line, respectively. Subsequently, as in the upper two lines in FIG. 5, PMMA is applied to regions 6 each including carbon nanotubes between electrodes (electrode 4 and electrode 5) of each electrode pair, and the substrate is dried at 200° C. and then unnecessary carbon nanotubes are removed via oxygen plasma treatment as in the lower two lines in FIG. 5.

A protective layer may be provided on the surface of the carbon nanotube layer, if necessary. When the bolometer is used as an infrared sensor, the protective layer is preferably a material with high transparency in the infrared wavelength range to be detected, and for example, acrylic resins such as PMMA, epoxy resins, Teflon® and the like may be used.

Although the above embodiment indicates a bolometer element fabrication method having a sequence of forming an APTES layer on an Si substrate and forming a carbon nanotube layer and then forming electrodes, a fabrication method in which the sequence is changed as follows may be employed. First, a first electrode and a second electrode are fabricated on a washed Si substrate via gold vapor deposition or the like, and then the substrate is immersed in an APTES aqueous solution, or an APTES aqueous solution is sprayed onto the substrate, and the substrate is washed with water and dried. Although the APTES film is an insulating film, it binds to a surface of a silicon dioxide film of the substrate and presents amino group on the surface, and thus, does not adhere to the gold electrode portions. A carbon nanotube dispersion liquid is applied thereon in a line shape, and gradually dried, and carbon nanotubes are deposited on an edge of the line shape droplet in a networked manner or while at least part of the carbon nanotubes being aligned to form a carbon nanotube wire, and the opposite ends of the wire are directly connected to the electrodes. When carbon nanotubes are connected between adjacent electrodes pairs, unnecessary carbon nanotubes present between the electrode pairs may be removed via a method that is similar to the above.

Second Embodiment

In an embodiment, a semiconducting carbon nanotube dispersion liquid is applied in a circular dot shape on a substrate. Next, when the substrate is put under a condition in which a solvent of the dispersion liquid can evaporate, water of the dispersion liquid is gradually dried from an edge of the circular shape because an evaporation rate is higher in the vicinity of an outer edge of a droplet (an outer circumference of a dot) than in the vicinity of a center of the droplet. At that time, the edge of the circular shape serves to pin a contact line of a droplet, causing a capillary flow toward the edge to occur inside the droplet, and carbon nanotubes move outward from a center of the droplet and accumulate at the edge while being aligned approximately in parallel with the edge, and a circular shape aligned film (circular shape wire) is thus formed. Also, a degree of alignment of carbon nanotubes can appropriately be controlled by conditions such as a diameter and a length of the carbon nanotubes, a concentration of a surfactant and a drying rate, and adjustment of these conditions also enables obtainment of a circular shape (doughnut shape) accumulation of networked carbon nanotubes that are little aligned.

The size of the circular shape is desirably 10 μm to 1 cm in diameter, preferably 20 μm to 1 mm, and more preferably 30 μm to 500 μm.

As the carbon nanotubes, the carbon nanotube dispersion liquid, and preparation methods thereof, the width and thickness of the carbon nanotube wire to be formed, and the APTES solution used for forming an interlayer and the like, those described in the first embodiment can be applied as appropriate.

A bolometer of the present embodiment can be manufactured, for example, as follows after forming such circular shape wire of semiconducting carbon nanotubes as above on a substrate. Since carbon nanotubes are deposited in a networked manner or in a at least partially aligned manner on a circumference of circle, the carbon nanotube wire is each fabricated in a doughnut shape. A first electrode and a second electrode are fabricated via gold vapor deposition in such a manner that an arc of the circle of carbon nanotubes is approximately parallel to a direction of electrical current flowing between the first electrode and the second electrode.

In the bolometer of the present embodiment, the distance between the first electrode and the second electrode is preferably 1 μm to 500 μm, and more preferably 10 μm to 300 μm. For miniaturization, it is more preferably 1 μm to 200 μm. When the distance between the electrodes is 1 μm or more, a reduction in the nature of TCR can be suppressed, even in the case of containing a small amount of metallic carbon nanotubes. In addition, the distance between the electrodes of 50 μm or less is advantageous when the bolometer is applied to an image sensor by two-dimensionally arraying. The length of the electrode 4 and the electrode 5 is preferably short as long as carbon nanotubes can connect the both electrodes, and electrically connect them, and the part connecting to carbon nanotubes of 50 μm or less is advantageous when the bolometer is applied to an image sensor by two-dimensionally arraying.

Figure 6:
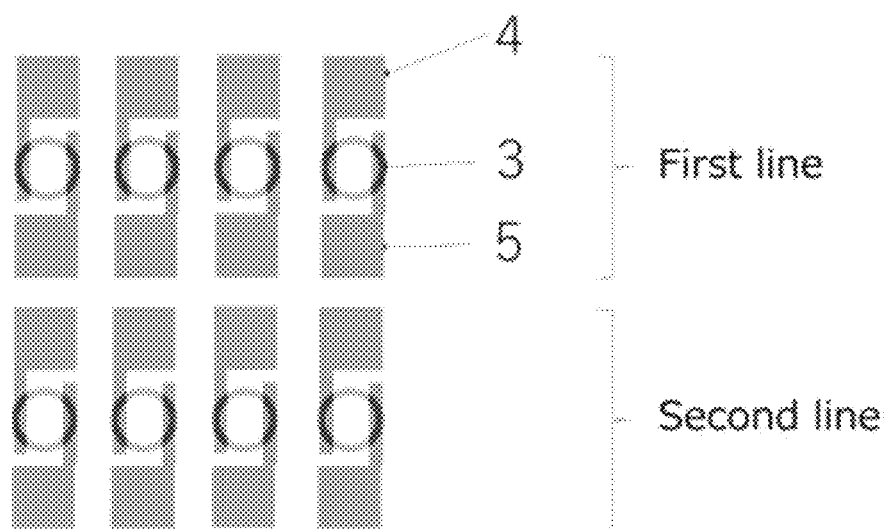
FIG. 6 is an example in which circular shape dots are arranged to electrode lines.
Figure 7:
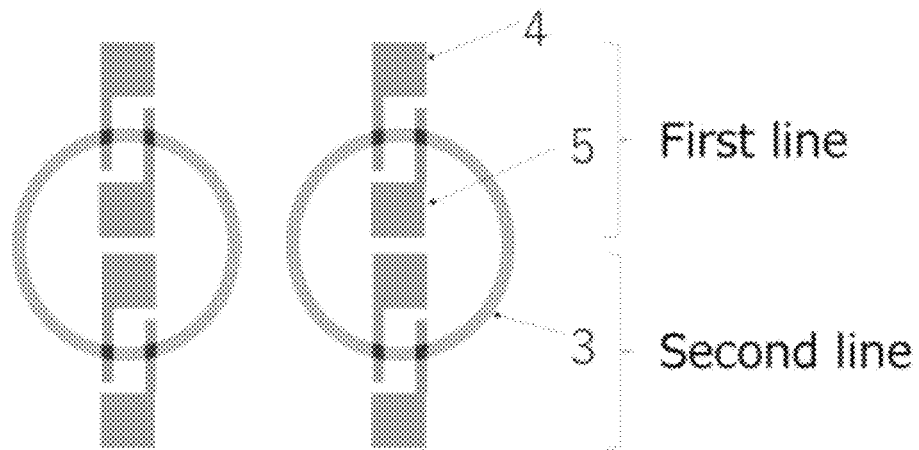
FIG. 7 is an example in which facing circular arcs of a circular shape are arranged to different electrode lines.
Figure 8:
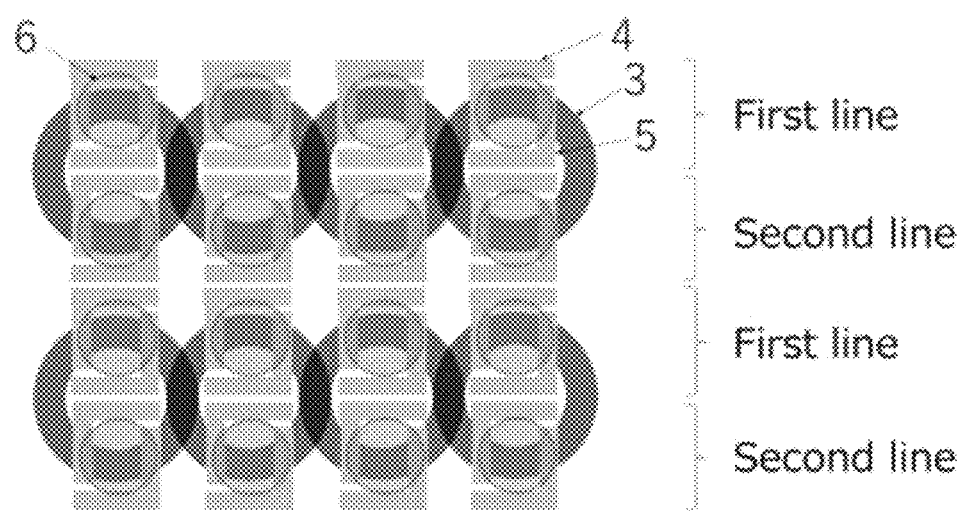
FIG. 8 is an example in which an array is manufactured using a circular shape.

The electrodes are installed in such a manner as to be connected by both of two circular arc-shape wires facing each other as in FIG. 6, or are installed in such a manner as to be connected by one circular arc-shape wire as in FIG. 7. The electrodes being connected by two circular arc-shape wires allows a resistance to be reduced by approximately half and thus is advantageous for reduction in resistance; however, a length of the electrodes needs to be longer than that of a region including the two wires. On the other hand, the electrodes being connected by one circular arc-shape wire alone enables making a width of connection between carbon nanotubes and the electrodes narrow, for example, 50 μm or less, which is advantageous for element downsizing such as two-dimensional arraying. Also, applying the dispersion liquid in such a manner that a diameter of applied circular shape dispersion liquid corresponds to an interval between elements as in FIG. 7 enables using two circular arc wires facing each other at opposite ends of a diameter of each circle for two lines, a first line and a second line, of electrode pairs and thus enables simple and easy arraying. FIG. 8 illustrates an example of arraying in the present embodiment. As in the first embodiment, PMMA is applied to regions 6 each including carbon nanotubes between electrodes of each electrode pair, and unnecessary carbon nanotubes are removed via oxygen plasma treatment.

Figure 9:
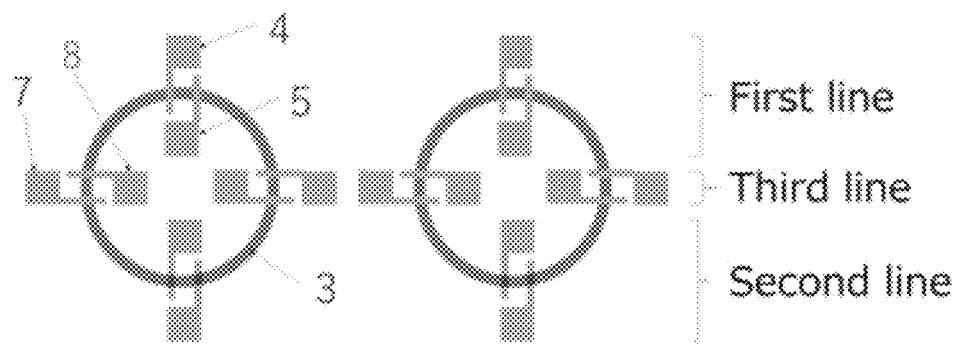
FIG. 9 is an example in which different electrode lines are arrange on two facing circular arcs of a circular shape and an intermediate position thereof.

Also, where a finer and denser array is formed, as in FIG. 9, pairs of third and fourth electrodes (7 and 8) of a third electrode pair line, which form a line extending in a direction approximately perpendicular to respective pairs of first and second electrodes (4 and 5) of a first electrode pair line and a second electrode pair line, can be fabricated on circular arc parts that are 90° from circular arcs facing each other in a diameter direction.

More specifically, in each of circles of circular shape wires of carbon nanotubes, the circles being arranged in a line, as illustrated in FIG. 9, two circular arc parts facing each other in a longitudinal diameter direction are used for the first line and second line of the electrode pair lines, and furthermore, lateral circular arc parts located approximately 90° from the diameter direction are used for the third line of the electrode pair lines. In other words, the third electrode pair line is disposed in such a manner that the electrode pairs (7, 8) forming the electrode pair line are approximately perpendicular to the electrode pairs (4, 5) forming the first and second electrode pair lines.

Such bolometer electrodes can be manufactured by forming carbon nanotube circular shape wires arranged in one line formed from one line of circular shape droplets of a carbon nanotube dispersion liquid and then disposing three lines of electrode pairs on the thus-formed circular shape wires in such a manner that each circular shape wire approximately perpendicularly bridges the respective pairs of electrodes included in the respective electrode pair lines. Upon removal of unnecessary carbon nanotubes among the electrode pairs via, e.g., oxygen plasma, a bolometer electrode including three electrode pair lines to which circular arc-shape wires cut out from carbon nanotube circular shape wires arranged in one line are connected in such a manner as to approximately perpendicularly bridge the respective pairs of electrodes is formed.

In this case, as illustrated in FIG. 9, four elements can be fabricated from one circular shape wire, enabling cost reduction and simplification.

Figure 10:
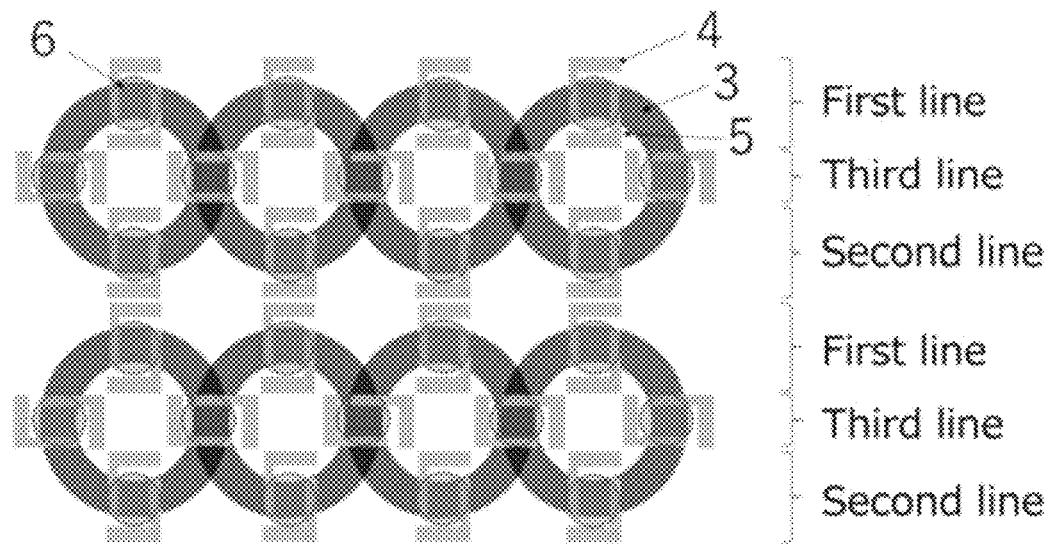
FIG. 10 is an example in which three lines of electrode are arranged on circular shapes.
Figure 11:
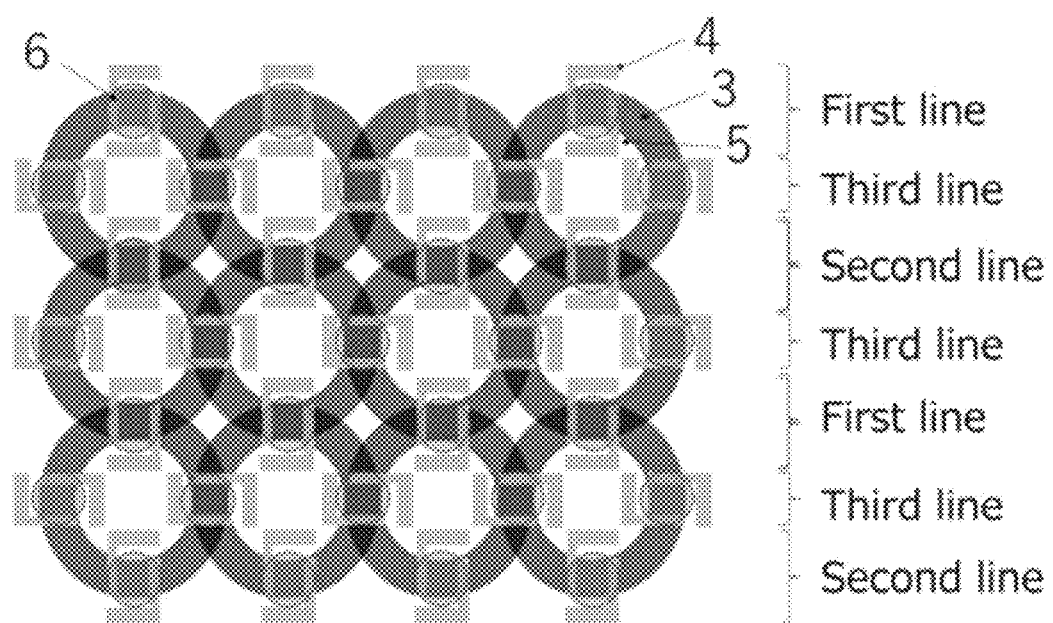
FIG. 11 is an example in which three lines of electrode are arranged on circular shapes.

FIGS. 10 and 11 each illustrate a further example of arraying in the embodiment in which a third electrode line is fabricated. As illustrated in these examples, a finer and denser array may be provided by disposing an electrode pair on each of parts at which laterally arranged circular shape wires and/or longitudinally arranged circular shape wires overlap each other. As in the first embodiment, processing for removing unnecessary carbon nanotubes is performed.

When carbon nanotubes are connected also to an adjacent electrode pair because the carbon nanotube wire is in a doughnut circle shape, for example, unnecessary carbon nanotubes are removed via the following method. An acrylic resin solution such as a polymethylmethacrylate resin (PMMA) is applied to regions each including an area between electrodes on the formed carbon nanotube fine wire to form protective layers of PMMA. The substrate is heated at 200° C. in the atmosphere, extra solvent, impurities, etc., are removed and then the entire substrate is subjected to oxygen plasma treatment to remove extra carbon nanotubes, etc., present in regions, other than the regions 6 covered by the PMMA layer, of the carbon nanotube layer 3.

Also in the present embodiment, a protective layer may be provided on the surface of the carbon nanotube layer, if necessary. When the bolometer is used as an infrared sensor, the protective layer is preferably a material with high transparency in the infrared wavelength range to be detected, and for example, acrylic resins such as PMMA, epoxy resins, Teflon® and the like may be used.

Although the above embodiment indicates a bolometer element fabrication method having a sequence of forming an APTES layer on an Si substrate and forming a carbon nanotube layer and then forming electrodes, a fabrication method in which the sequence is changed as follows may be employed. First, a first electrode and a second electrode are fabricated on a washed Si substrate via gold vapor deposition or the like, and then the substrate is immersed in an APTES aqueous solution or an APTES aqueous solution is sprayed onto the substrate, and the substrate is washed and dried. Although the APTES film is an insulating film, it binds to a surface of a silicon dioxide film of the substrate and presents amino group on the surface, and thus, does not adhere to the gold electrode portions. A carbon nanotube dispersion liquid is applied thereon in a circular shape, and gradually dried, carbon nanotubes are deposited on an edge of the circular shape droplet in a networked manner or while at least part of the carbon nanotubes being aligned to form a circular shape (doughnut shape) wire. The opposite ends of the circular shape wire are directly connected to the electrodes. When the carbon nanotubes are connected between adjacent electrodes pairs, unnecessary carbon nanotubes may be removed via a method that is similar to the above.

Third Embodiment

A bolometer according to the present embodiment has a structure that is similar to that in FIG. 1 but uses a plastic substrate instead of an Si substrate 1. Also, polylysine is used instead of an APTES layer 2. Polylysine easily binds to a surface of a plastic substrate, and, like APTES, presents amino group on a surface, and thus, a polylysine film does not repel a carbon nanotube dispersion liquid and easily pins droplets of dispersion liquid. For a polylysine film application method and a bolometer manufacturing method, steps that are similar to the steps described in the first and second embodiments can be used. The present embodiment enables employment of a flexible substrate and thus can be used for, e.g., a flexible image sensor.

In the above embodiments, examples in which APTES or polylysine is used as the material of an interlayer that enhances binding between the substrate and carbon nanotubes are described; however, material of the interlayer is not limited thereto. It is preferable that a material of the interlayer be a compound having both a moiety that binds or adheres to a surface of the substrate and a moiety that binds or adheres to the carbon nanotube. Consequently, the interlayer functions as a medium serving to bind the substrate and the carbon nanotube. Here, for binding between the substrate and the interlayer, and binding between the interlayer and the carbon nanotube, not only chemical binding but also various intermolecular interactions such as electrostatic interaction, surface adsorption, hydrophobic interaction can be used.

Examples of the moiety that binds or adheres to the surface of the substrate in the material of the interlayer include hydrophobic moiety, hydrophobic group, and the like such as alkoxysilyl group (SiOR), SiOH or the like. Examples of hydrophobic moiety and hydrophobic group include methylene group (methylene chain) and alkyl group each having a carbon number of preferably 1 or more, more preferably 2 or more, and preferably 20 or less, more preferably 10 or less, and the like.

Examples of the moiety that binds or adheres to the carbon nanotube in the material of the interlayer include amino groups such as primary amino group (—$NH_2$), secondary amino group (—$NHR_1$) or tertiary amino group (—$NR_1R_2$), ammonium group (—$NH_4$), imino group (=NH), imide group (—C(=O)—NH—C(=O)—), amide group (—C(=O)NH—), epoxy group, isocyanurate group, isocyanate group, ureide group, sulfide group, mercapto group, and the like.

The material of the interlayer is not specifically limited but examples thereof include a silane coupling agent. A silane coupling agent includes both a reactive group that binds to or interacts with an inorganic material and a reactive group that binds to or interacts with an organic material in a molecule, and serves to bind the organic material and the inorganic material. In the present embodiment, the carbon nanotube can be fixed on the substrate by forming a single-layer multimolecular film presenting a reactive group that binds to the carbon nanotube on the substrate using, for example, a silane coupling agent including both a reactive group that binds to a substrate such as an Si substrate and a reactive group that binds to a carbon nanotube.

Examples of the silane coupling agent include:

silane coupling agents (aminosilane compounds) each including amino group and alkoxysilyl group such as 3-aminopropyltrimethoxysilane, 3-aminopropylmethyltriethoxysilane, 3-aminopropylmethyltrimethoxysilane, 3-aminopropyltriethoxysilane (APTES), 3-(2-aminoethyl)aminopropyltrimethoxysilane, N-(2-aminoethyl)-3-aminopropyltrimethoxysilane, N-2-(aminoethyl)-3-aminopropylmethyltrimethoxysilane and N-(2-aminoethyl)-3-aminopropylmethyldimethoxysilane;

silane coupling agents each including epoxy group and alkoxysilyl group such as 3-glycidoxypropyltrimethoxysilane, 3-glycidoxypropyltriethoxysilane, 3-glycidoxypropylmethyldimethoxysilane, 3-glycidoxypropylmethyldiethoxysilane, 2-(3,4-epoxycyclohexyl)ethyltrimethoxysilane, 3-glycidoxypropyldiethoxysilane and triethoxy(3-glycidyloxypropyl)silane;

isocyanurate-based silane coupling agents such as tris-(trimethoxysilylpropyl)isocyanurate;

ureide-based silane coupling agents such as 3-ureidepropyltrialkoxysilane;

mercapto-based silane coupling agents such as 3-mercaptopropylmethyldimethoxysilane, 3-mercaptopropyltrimethoxysilane and 3-mercaptopropyltriethoxysilane;

sulfide-based silane coupling agents such as bis(triethoxysilylpropyl)tetrasulfide; and isocyanate-based silane coupling agents such as 3-isocyanatepropyltriethoxysilane.

Particularly, a silane coupling agent including amino group (aminosilane compound) is preferable because of good binding to carbon nanotubes.

Other examples of the material of the interlayer include polymers each including a moiety that can bind or adhere to a substrate such as a plastic substrate and a reactive group that binds to a carbon nanotube, for example, a cation polymer.

Examples of such polymers include poly(N-methylvinylamine), polyvinylamine, polyallylamine, polyallyldimethylamine, polydiallylmethylamine, polydiallyldimethylammonium chloride, polydiallyldimethylammonium trifluoromethanesulfonate, polydiallyldimethylammonium nitrate, poly diallyldimethylammonium perchlorate, polyvinylpyridinium chloride, poly(2-vinylpyridine), poly(4-vinylpyridine), polyvinyl imidazole, poly(4-aminomethylstyrene), poly(4-aminostyrene), polyvinyl(acrylamide-co-dimethylaminopropylacrylamide), polyvinyl(acrylamide-co-dimethylaminoethylmethacrylate), polyethylenimine (PEI), DAB-Am and polyamideamine dendrimer, polyaminoamide, polyhexamethylene biguanide, polydimethylamine-epichlorohydrin, a product of alkylation of polyethylenimine by methyl chloride, a product of alkylation of polyaminoamide by epichlorohydrin, cationic polyacrylamide using a cationic monomer, a formalin condensate of dicyandiamide, dicyandiamide, polyalkylenepolyamine polycondensate, natural cationic polymers (for example, partially deacetylated chitin, chitosan and chitosan salt), synthetic polypeptides (for example, polyasparagine, polylysine, polyglutamine and polyarginine).

Among such polymers, a cation polymer including amino group and hydrophobic group or hydrophobic moiety is preferable from the perspective of fixing carbon nanotubes to the substrate.

Use of such polymer enables forming an interlayer presenting a plurality of reactive groups that bind or adhere to carbon nanotubes on a substrate. Such interlayer is not specifically limited but preferably is a single molecular film from the perspective of uniform adherence, and can have a thickness of 1 nm to 1 μm, preferably 2 nm to 100 nm.

The material of the interlayer can appropriately be selected in consideration of the material of the substrate to be used. Here, a material forming the substrate may be an inorganic material or an organic material and any of those used in the relevant technical field can be used with no specific limitation. The inorganic material is not limited but examples thereof include, e.g., glass, Si, $SiO_2$, SiN and the like, and the organic material is not limited but examples thereof include, e.g., plastic, rubber and the like, for example, polyimide, polyethylene, polypropylene, polystyrene, polyvinyl chloride, polyethylene terephthalate, acrylonitrile styrene resin, acrylonitrile butadiene styrene resin, fluororesin, methacryl resin, polycarbonate and the like, and in an embodiment, a material used for a flexible substrate is preferable.

The whole or part of the example embodiments disclosed above can be described as, but not limited to, the following supplementary notes.

[Supplementary Note 1]

A bolometer manufacturing method comprising:

fabricating a set of two carbon nanotube wires that are approximately parallel to each other, at edges of a line shape or fabricating a circular shape carbon nanotube wire at a circular circumference of a circular shape by applying a semiconducting carbon nanotube dispersion liquid in the line shape or the circular shape on a substrate and drying the dispersion liquid, a width of each wire being 5 μm or more; and connecting a part of each wire to a first electrode and a second electrode.

[Supplementary Note 2]

The bolometer manufacturing method according to supplementary note 1, wherein a width of the line shape or a diameter of the circular shape is 20 μm or more and 1 cm or less.

[Supplementary Note 3]

The bolometer manufacturing method according to supplementary note 1 or 2, wherein a thickness of each carbon nanotube wire is 30 nm or more and 1 μm or less.

[Supplementary Note 4]

The bolometer manufacturing method according to any one of supplementary notes 1 to 3, wherein the semiconducting carbon nanotube dispersion liquid comprises 90% by mass or more of a semiconducting carbon nanotube in a total amount of carbon nanotube.

[Supplementary Note 5]

The bolometer manufacturing method according to any one of supplementary notes 1 to 4, wherein the semiconducting carbon nanotube dispersion liquid comprises a critical micellar concentration or more and 5% by mass or less of a non-ionic surfactant.

[Supplementary Note 6]

The bolometer manufacturing method according to any one of supplementary notes 1 to 5, comprising connecting a line-shape wire manufactured from one line of line-shape droplet of the semiconducting carbon nanotube dispersion liquid or one line of circular shape wires manufactured from one line of circular shape droplets of the semiconducting carbon nanotube dispersion liquid to two or more lines of electrode pairs in such a manner as to approximately perpendicularly bridge each electrode pair included in the electrode pair lines.

[Supplementary Note 7]

A bolometer comprising at least three electrode pair lines, wherein:

circular arc-shape wires cut out from semiconducting carbon nanotube circular shape wires arranged in one line are connected to the three electrode pair lines in such a manner as to approximately perpendicularly bridge respective electrode pairs included in the respective electrode pair lines; and in one line of the three electrode pair lines, each of the electrode pairs included in the electrode pair line is disposed approximately perpendicularly to respective electrode pairs included in the other two lines.

[Supplementary Note 8]

A bolometer manufacturing method comprising at least three electrode pair lines, the method comprising:

forming semiconducting carbon nanotube circular shape wires arranged in one line; and disposing the three electrode pair lines in such a manner that the semiconducting carbon nanotube circular shape wires are approximately perpendicular to respective electrode pairs included in the electrode pair lines, wherein one line of the three electrode pair lines is disposed in such a manner that each electrode pair included in the electrode pair line is approximately perpendicular to respective electrode pairs included in the other two electrode pair lines.

[Supplementary Note 9]

The bolometer manufacturing method according to any one of supplementary notes 1 to 6 and 8, comprising covering a carbon nanotube wire between a first electrode and a second electrode, the carbon nanotube wire being a part of a line shape or a circular arc of the circular shape, and respective parts of connection between the carbon nanotube wire and the first electrode and the second electrode, with a protective film and removing carbon nanotubes in a part not covered by the protective film.

[Supplementary Note 10]

The bolometer manufacturing method according to any one of supplementary notes 1 to 6 and 8 and 9, wherein a carbon nanotube dispersion liquid is applied in a line shape or a circular shape on a substrate, using a dispenser, an inkjet or a printer.

[Supplementary Note 11]

The bolometer manufacturing method according to any one of supplementary notes 1 to 6 and 8 to 10, wherein the bolometer is a bolometer array.

[Supplementary Note 12]

The bolometer manufacturing method according to any one of supplementary notes 1 to 6 and 8 to 11, wherein the bolometer is an infrared sensor.

EXAMPLES

The present invention will be described further in detail by way of examples below, but the present invention should not be limited by the following examples.

100 mg of single-walled carbon nanotubes (Meijo Nano Carbon Co., Ltd., EC 1.0 (diameter: about 1.1 to 1.5 nm (average diameter 1.2 nm)) was put in a quartz boat and heat treatment was performed under a vacuum atmosphere using an electric furnace. The heat treatment was performed at a temperature of 900° C. for 2 hours. The weight after heat treatment was reduced to 80 mg, and it was found that the surface functional groups and impurities were removed. After the obtained single-walled carbon nanotubes were fractured with tweezers, 12 mg of which was immersed in 40 ml of an aqueous solution of 1 wt % surfactant (polyoxyethylene (100) stearyl ether) and after sufficient sedimentation, the mixture was subjected to ultrasonic dispersion treatment (BRANSON ADVANCED-DIGITAL SONIFIER apparatus, output: 50 W) for 3 hours. Through this step, aggregates of the carbon nanotubes in the solution were eliminated. Through this procedure, bundles, remaining catalysts, and the like were removed to obtain a carbon nanotube dispersion liquid. The dispersion liquid was applied on a $SiO_2$ substrate and dried at 100° C., which was then observed by an atomic force microscope (AFM) to observe the length and the diameter of carbon nanotubes. As a result, it was found that 70% of the single-walled carbon nanotubes had a length within a range of 500 nm to 1.5 μm and the average length thereof was approximately 800 nm.

The above obtained carbon nanotube dispersion liquid was introduced into the separation apparatus having a double tube structure. About 15 ml of water, about 70 ml of the carbon nanotube dispersion liquid, and about 10 ml of 2 wt % aqueous surfactant solution were put into the outer tube of the double tube, and about 20 ml of 2 wt % aqueous surfactant solution was also put into the inner tube. Thereafter, the bottom lid of the inner tube was opened, resulting in a three-layer structure having different surfactant concentrations. A voltage of 120 V was applied with the bottom side of the inner tube being anode, and the upper side of the outer tube being cathode, and semiconducting carbon nanotubes were transferred towards the anode side. On the other hand, metallic carbon nanotubes were transferred towards the cathode side. After 80 hours from the start of separation, semiconducting carbon nanotubes and metallic carbon nanotubes were separated cleanly. The separation step was carried out at room temperature (about 25° C.). The semiconducting carbon nanotube dispersion liquid transferred to the anode side was collected and analyzed using the light absorption spectrum, and it was found that the metallic carbon nanotubes components were removed. It was also found from the Raman spectrum that 99 wt % of the carbon nanotubes in the carbon nanotube dispersion liquid transferred to the anode side were semiconducting carbon nanotubes. The most frequent diameter of the single-walled carbon nanotubes was about 1.2 nm (70% or more), and the average diameter was 1.2 nm.

The surfactant was partially removed from the carbon nanotube dispersion liquid containing 99 wt % semiconducting carbon nanotubes as described above (the carbon nanotube dispersion liquid transferred to the anode side) to adjust the concentration of the surfactant to be 0.05 wt %. Thereafter, the carbon nanotube dispersion liquid was adjusted into a carbon nanotube dispersion liquid A having a carbon nanotube concentration in the dispersion liquid of 0.01 wt % (referred to as dispersion liquid A). This dispersion liquid A was used to form a carbon nanotube layer.

An Si substrate coated with $SiO_2$ was sequentially washed with acetone, isopropyl alcohol and water and subjected to oxygen plasma treatment to remove organic substances on a surface. The substrate was immersed in a 0.1% by volume APTES aqueous solution for 30 minutes and washed with water, and then dried.

The dispersion liquid A was applied in the shape of dots to the APTES adhering substrate using a dispenser. A diameter of the dots was 360 μm, an interval of the dots was 1 mm, a droplet amount per dot was approximately 1 μL. The dispersion liquid A was gradually dried at room temperature (approximately 25° C.), atmospheric pressure and a humidity of 50% RH. The substrate was washed with water, ethanol and isopropyl alcohol and then dried at 110° C. Subsequently, the substrate was heated at 200° C. in the atmosphere to remove a non-ionic surfactant, etc., in the dispersion liquid A. An SEM observation of an edge of a dot shape showed that carbon nanotubes aggregated in a doughnut circle shape having a width of 10 μm to 20 μm from the edge, with a high degree of aligned, as in FIG. 2. Also, the SEM image was subjected to two-dimensional Fourier transform processing to calculate an integrated value f of amplitudes at frequencies of −1 μm$^{-1}$ to +1 μm$^{-1}$ in one direction from a center, and where fx is an integrated value relating to a direction x in which the integrated value f becomes maximum and fy is an integrated value relating to a direction y perpendicular to the direction x, fx/fy was calculated to be 2.0. A thickness of the carbon nanotube layer was measured using a laser microscope and the thickness was approximately 100 nm in average (average value of 10 points) at 10 μm from the edge.

Gold was vapor-deposited on each of circular arcs of circular shape carbon nanotube aligned films obtained above as a first electrode and a second electrode in such a manner as to have a thickness of 300 nm and provide a space of 100 μm between the electrodes, to fabricate the electrodes. At this time, the electrodes were installed in such a manner that circular arc lines are approximately parallel to a direction in which electrical current flows between the electrodes of each electrode pair. Also, at the same time, as in FIG. 7, first electrodes and second electrodes of a second electrode pair line were installed at positions on respective circular arcs facing the above circular arcs. Next, regions including carbon nanotubes between each first electrode and the corresponding second electrode, and respective parts of connection between the carbon nanotubes and the first electrode and the second electrode were protected by application of a PMMA anisole solution. Subsequently, the substrate was dried for one hour under a condition of 200° C. in the atmosphere and unnecessary carbon nanotubes connecting adjacent electrode pairs were removed via oxygen plasma treatment.

Comparative Example 1

A carbon nanotube dispersion liquid A was prepared as in the steps of Example 1. After an Si substrate being washed as in Example 1, APTES was made to adhere to an entire surface of the substrate. Upon approximately 200 μL of the dispersion liquid A being dripped onto the substrate, the dispersion liquid A spread to the entire surface of the substrate. The substrate was washed with water, ethanol and isopropyl alcohol and then dried at 110° C. and subsequently heated at 200° C. in the atmosphere to remove a non-ionic surfactant, etc. An SEM observation of the substrate showed that carbon nanotubes adhered to the substrate in a random network form. A thickness of the carbon nanotube layer was measured using a laser microscope and the thickness was approximately 10 nm in average.

Thereafter, gold was vapor-deposited on the carbon nanotube layer above as a first electrode and a second electrode in such a manner as to have a thickness of 300 nm and provide a space of 100 μm between the electrodes. Carbon nanotubes, and the first electrode and the second electrode were protected with PMMA with the same area as in Example 1, dried for one hour under a condition of 200° C. in the atmosphere, and unnecessary carbon nanotubes were removed via oxygen plasma treatment.

Comparison Between Example 1 and Comparative Example 1

Table 1 indicates a result of film resistance measurement at 300 K and a TCR value in a range of 20° C. to 40° C. for each of bolometers fabricated from respective carbon nanotube films obtained in Example 1 and Comparative Example 1. It turned out that the aligned carbon nanotube film in Example 1 had a film resistance no less than one digit lower than that of Comparative Example 1. This is because in Example 1, areas of points of contact between electrical conduction paths of carbon nanotubes increased because of alignment of the carbon nanotubes. As a result, at the time of sensor fabrication, noise was reduced and sensitivity was enhanced.

TABLE 1

Measurement Results of Resistance and TCR

|  | Example 1 | Comparative Example 1 |
|---|---|---|
| Film Resistance (Ω) | $1 \times 10^8$ | $1 \times 10^9$ |
| TCR (%/K) | −6.0 | −5.2 |

EXPLANATION OF REFERENCE

1 Si substrate
2 APTES layer
3 Carbon nanotube layer
4 First electrode
5 Second electrode
6 PMMA layer
7 Third electrode
8 Fourth electrode

What is claimed is:

1. A bolometer manufacturing method comprising:
  fabricating a set of two carbon nanotube wires that are approximately parallel to each other at edges of a line shape, or fabricating a circular shape carbon nanotube wire at a circular circumference of a circular shape, by applying a semiconducting carbon nanotube dispersion liquid in the line shape or the circular shape on a substrate, and drying the dispersion liquid, a width of each wire being 5 μm or more; and
  connecting a part of each wire to a first electrode and a second electrode.

2. The bolometer manufacturing method according to claim 1, wherein a width of the line shape or a diameter of the circular shape is 20 μm or more and 1 cm or less.

3. The bolometer manufacturing method according to claim 1 wherein a thickness of each carbon nanotube wire is 30 nm or more and 1 μm or less.

4. The bolometer manufacturing method according to claim 1, wherein the semiconducting carbon nanotube dispersion liquid comprises 90% by mass or more of a semiconducting carbon nanotube in a total amount of carbon nanotube.

5. The bolometer manufacturing method according to claim 1, wherein the semiconducting carbon nanotube dispersion liquid comprises a critical micellar concentration or more and 5% by mass or less of a non-ionic surfactant.

6. The bolometer manufacturing method according to claim 1, comprising connecting a line-shape wire manufactured from one line-shape droplet of the semiconducting carbon nanotube dispersion liquid, or one line of circular shape wires manufactured from one line of circular shape droplets of the semiconducting carbon nanotube dispersion liquid to two or more lines of electrode pairs in such a manner as to approximately perpendicularly bridge each electrode pair included in the electrode pair lines.

7. A bolometer comprising at least three electrode pair lines, wherein:
  circular arc-shape wires cut out from semiconducting carbon nanotube circular shape wires arranged in one line are connected to the three electrode pair lines in such a manner as to approximately perpendicularly bridge respective electrode pairs included in the respective electrode pair lines; and
  in one line of the three electrode pair lines, each of the electrode pairs included in the electrode pair line is disposed approximately perpendicularly to respective electrode pairs included in the other two lines.

8. A bolometer manufacturing method comprising at least three electrode pair lines, the method comprising:
  forming semiconducting carbon nanotube circular shape wires arranged in one line; and
  disposing the three electrode pair lines in such a manner that the semiconducting carbon nanotube circular shape wires are approximately perpendicular to respective electrode pairs included in the electrode pair lines,
  wherein one line of the three electrode pair lines is disposed in such a manner that each electrode pair included in the electrode pair line is approximately perpendicular to respective electrode pairs included in the other two electrode pair lines.

9. The bolometer manufacturing method according to claim 1, comprising covering a carbon nanotube wire between a first electrode and a second electrode, the carbon nanotube wire being a part of a line shape or a circular arc of the circular shape, and respective parts of connection between the carbon nanotube wire and the first electrode and the second electrode, with a protective film and removing carbon nanotubes in a part not covered by the protective film.

10. The bolometer manufacturing method according to claim 1, wherein a carbon nanotube dispersion liquid is applied in a line shape or a circular shape on a substrate, using a dispenser, an inkjet or a printer.

* * * * *